United States Patent
Haas et al.

(10) Patent No.: US 8,269,152 B2
(45) Date of Patent: Sep. 18, 2012

(54) DEVICE FOR CONVERTING INDUCTIVELY TRANSMITTED ELECTRIC POWER, AND METHOD FOR THE PRODUCTION OF SUCH A DEVICE

(75) Inventors: Karl-Heinz Haas, Achstetten (DE); Roland Jans, Ulm (DE); Turgay Nergiz, Ulm (DE)

(73) Assignee: MGS Modular Galley Systems AG, Elchingen (DE)

( * ) Notice: Subject to any disclaimer, the term of this patent is extended or adjusted under 35 U.S.C. 154(b) by 624 days.

(21) Appl. No.: 12/523,169

(22) PCT Filed: Jan. 22, 2008

(86) PCT No.: PCT/EP2008/000458
§ 371 (c)(1),
(2), (4) Date: Sep. 2, 2009

(87) PCT Pub. No.: WO2008/089952
PCT Pub. Date: Jul. 31, 2008

(65) Prior Publication Data
US 2010/0078427 A1      Apr. 1, 2010

(30) Foreign Application Priority Data
Jan. 23, 2007   (DE) .................... 10 2007 004 275

(51) Int. Cl.
*H05B 6/02*   (2006.01)

(52) U.S. Cl. .................. 219/601; 219/620; 219/647
(58) Field of Classification Search .................. 219/601, 219/620, 647
See application file for complete search history.

(56) References Cited

U.S. PATENT DOCUMENTS

| | | | |
|---|---|---|---|
| 3,761,668 A | 9/1973 | Harnden, Jr. et al. |
| 4,776,386 A | 10/1988 | Meier |
| 6,359,268 B1 | 3/2002 | Walter |
| 7,170,037 B2 | 1/2007 | Walter |

FOREIGN PATENT DOCUMENTS

| | | |
|---|---|---|
| DE | 73 19 719 | 7/1977 |
| DE | 29612514 | 10/1996 |
| DE | 19818831 A1 | 4/1998 |
| DE | 10150949 A1 | 10/2001 |
| EP | 0203883 A1 | 4/1986 |
| EP | 0830051 A2 | 3/1998 |
| FR | 2231177 | 12/1974 |
| FR | 2582896 | 6/1985 |
| JP | 09069456 | 11/1997 |

*Primary Examiner* — Thien F Tran
(74) *Attorney, Agent, or Firm* — Davis & Bujold, P.L.L.C.

(57) ABSTRACT

A consumer unit (7) for converting inductively transmitted electric power. The device comprises at least one secondary coil (5) for accepting power from a alternating electromagnetic field. The secondary coil (5) is electrically connected to at least one consumer in which the electric power is converted. The consumer unit (7) is designed as a replaceable module for an induction furnace (25).

15 Claims, 5 Drawing Sheets

US 8,269,152 B2

Figure 1:
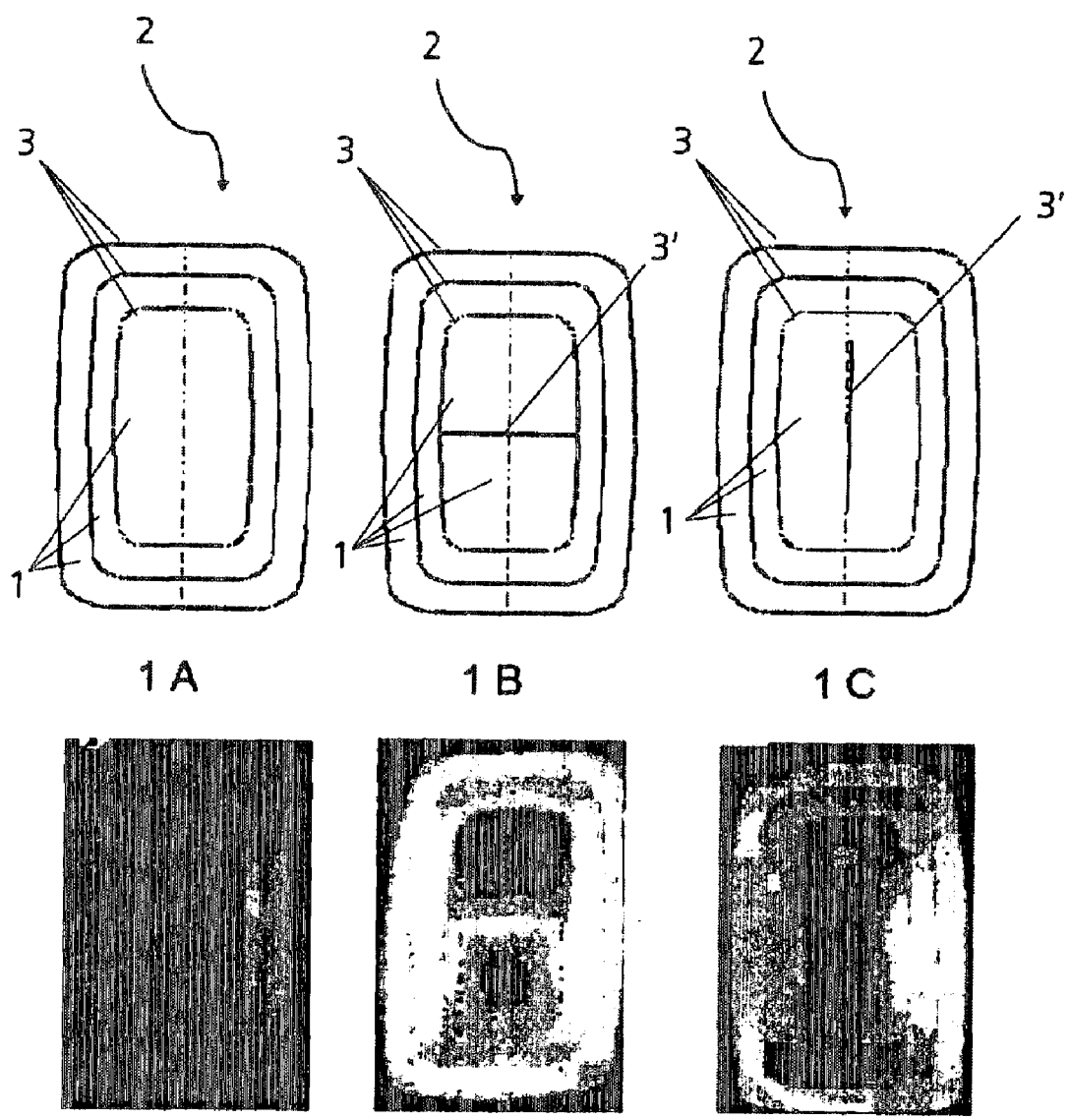

DEVICE FOR CONVERTING INDUCTIVELY TRANSMITTED ELECTRIC POWER, AND METHOD FOR THE PRODUCTION OF SUCH A DEVICE

This application is a National Stage completion of PCT/EP2008/000458 filed on Jan. 22, 2008, which claims priority from German patent application serial no. 10 2007 004 275.4 filed Jan. 23, 2007.

FIELD OF THE INVENTION

The invention relates to a device for converting inductively transmitted electrical energy in an accommodating unit and a consumer unit, to a consumer unit for converting inductively transmitted electrical energy and to a method for the production of a consumer unit according to the invention.

BACKGROUND OF THE INVENTION

Such consumer units may be in particular cooking vessels for use in induction ovens. The mode of operation of an induction oven is based on the fact that such cooking vessels exhibit metal layers, in which heat is produced by means of eddy current generation by induction owing to the nonreactive resistance of the metal layers. Such a metal layer may be, for example, a metallic pot base, an aluminum shell or else a metal layer which has been glazed into a porcelain shell. Said metal layers make it possible to rapidly heat food by means of a high level of power transmission. However, there is often the difficulty of achieving a desired heat distribution, such as homogeneous heating, for example, over a relatively large area of the cooking vessel. This problem in particular arises from the fact that it is difficult primarily with the flat coil arrangements often used for producing the required electromagnetic alternating field to achieve a defined, in particular homogeneous heat distribution.

The abovementioned problem has a disadvantageous effect in particular when comparatively dry products need to be heated or when the geometry of the cooking vessel does not exhibit rotational symmetry, or only exhibits a small amount of rotational symmetry. When designing the described systems for inductively heating food, there is therefore often a conflict of aims which consists in on the one hand designing said conducting layer in such a way that defined heating, such as heating which is as homogeneous as possible, for example, of the area of interest results, but on the other hand achieving an efficiency which is as high as possible of the electromagnetic coupling of the cooking vessel to the alternating field achieving the desired currents. Similar conflicts of aims also result when realizing other withdrawable elements in induction ovens, where it is likewise necessary to find a compromise between good coupling to an external electromagnetic alternating field and efficient utilization of the electrical energy transmitted.

SUMMARY OF THE INVENTION

It is therefore the object of the present invention to specify a device and a method which makes it possible to design cooking vessels or other withdrawable elements for induction ovens with coupling to an external electromagnetic alternating field which is as efficient as possible in such a way that, at the same time, utilization which is as efficient as possible of the electrical energy transmitted is ensured.

This object is achieved by the devices having the features mentioned in claims 1 and 13 and by the method having the features mentioned in claim 11. The dependent claims relate to advantageous developments and variant embodiments of the invention.

The device according to the invention for converting inductively transmitted electrical energy exhibits an accommodating unit for accommodating at least one replaceable consumer unit.

The consumer unit according to the invention for converting inductively transmitted electrical energy exhibits at least one secondary coil for drawing energy from an electromagnetic alternating field. In this case, the secondary coil is electrically connected to at least one consumer, in which the electrical energy is converted. Said consumer unit is in the form of a replaceable module for an induction oven.

In accordance with the teaching of the invention, the consumer unit therefore exhibits at least two regions, which need to meet different demands. The first region is the region in which the secondary coil is arranged. The main demand placed on this region and therefore on the secondary coil consists in ensuring that electrical energy is drawn from said electromagnetic alternating field in a manner which is as efficient as possible. However, owing to the configuration of the consumer unit according to the invention, there are also further options for the design of the secondary coil. The secondary coil can be optimized to the extent that it draws the electromagnetic energy particularly efficiently from the electromagnetic alternating field; this is primarily possible by virtue of the fact that it is not necessary for any further consumers to be arranged in the region of the secondary coil which would give reason for compromises in the design of the region. In one variant of the invention, the secondary coil is formed as part of a printed circuit board, in particular as ring-shaped or spiral-shaped conductor tracks.

The consumer unit can have, as first consumer, an induction coil which is electrically connected to the secondary coil in particular by means of lines.

In addition, a temperature-regulated switch such as a thermostat, for example, can be arranged in the electrical connection between the secondary coil and the consumer.

A further advantage of the above-described solution according to the invention consists in the fact that the energy transmission from the induction oven into the consumer unit takes place in wireless fashion, i.e. without a DC link. This opens up the possibility in particular of using the control device, the coding system and the control panel of the induction oven such that the electrical internals in the consumer unit can be provided with a simple design, especially for applications in which the consumers are in the form of heating elements. This provides the possibility of transmitting high powers with the compact arrangements and in particular designing heating devices in such a way that they can be used as storage and transport containers specifically for applications in the catering sector in passenger aircraft.

Since the energy transmission takes place in a defined region, namely in particular in the region of the secondary coil, furthermore those regions of the overall arrangement, in particular the consumer unit, which are affected by strong electromagnetic alternating fields can be effectively limited. This means that legal requirements as regards electromagnetic compatibility which are of considerable importance in particular in the field of aviation can be adhered to more easily.

The consumers in the form of heating elements can in this case be realized as structured conducting regions in cooking vessels which are suitable for converting electrical current, owing to its nonreactive resistance, into heat and which are designed in such a way that the total flux beneath them results in a desired heat distribution. In this way, the above-described problem of undefined heating is effectively counteracted, and the formation of hot spots or else cold spots is avoided. Since, in accordance with the teaching of the invention, the consumers are used exclusively for converting the electrical energy drawn on the part of the secondary coil, there is an increased degree of freedom in terms of the design of the consumers, which in this case are formed as structured conducting regions, with the result that the design can be optimized in terms of the above-described desired heat distribution in certain regions of the cooking vessels. Such a desired heat distribution could, for example, consist in the fact that a higher temperature, in comparison with the peripheral regions of the base, is set in the region of the center of the base of a cooking vessel. As a result of this temperature distribution, the fact that, in cooking vessels, the greatest volume of food to be heated is generally located in the central region of the vessel is taken into account. The desired temperature distributions can be achieved, for example, by virtue of the fact that the dimensions, in particular the thickness or the width of the conducting regions are varied suitably.

Designing the cooking vessels to be formed from porcelain has proven to be particularly successful in this context; said conducting regions can be overglazed in a simple manner onto such vessels. In one variant of the invention, the conducting regions can also be applied by virtue of the fact that the cooking vessel is initially provided with a conducting layer, which is then partially removed by means of a sandblasting method. For the structuring of the conducting regions, it has in this case proven advantageous to remove the conducting layer using a mask, by means of which individual regions of the layer can be protected from the sandblasting.

It goes without saying that it is also conceivable, as an alternative to an embodiment made from porcelain, to produce the cooking vessels at least partially from cardboard, which results in a cost and weight advantage. Conducting regions for example in the form of a structured aluminum layer can also be applied to such cooking vessels.

There is a large number of possibilities for the selection of the consumer; in particular the consumer may be a coffee machine, a toaster, a waffle iron, a fryer, a sandwich maker, a baking oven, in particular a hot air oven, a water heater or water boiler, a grill plate, an egg cooker, an extractor hood or a microwave.

It is apparent from the outlined choice that the invention opens up the possibility of converting the energy transmitted inductively via the secondary coil into the consumer unit, whilst producing heat, into a large number of energy forms, in particular kinetic energy or electromagnetic field energy.

DETAILED DESCRIPTION OF THE DRAWINGS

Figure 2:
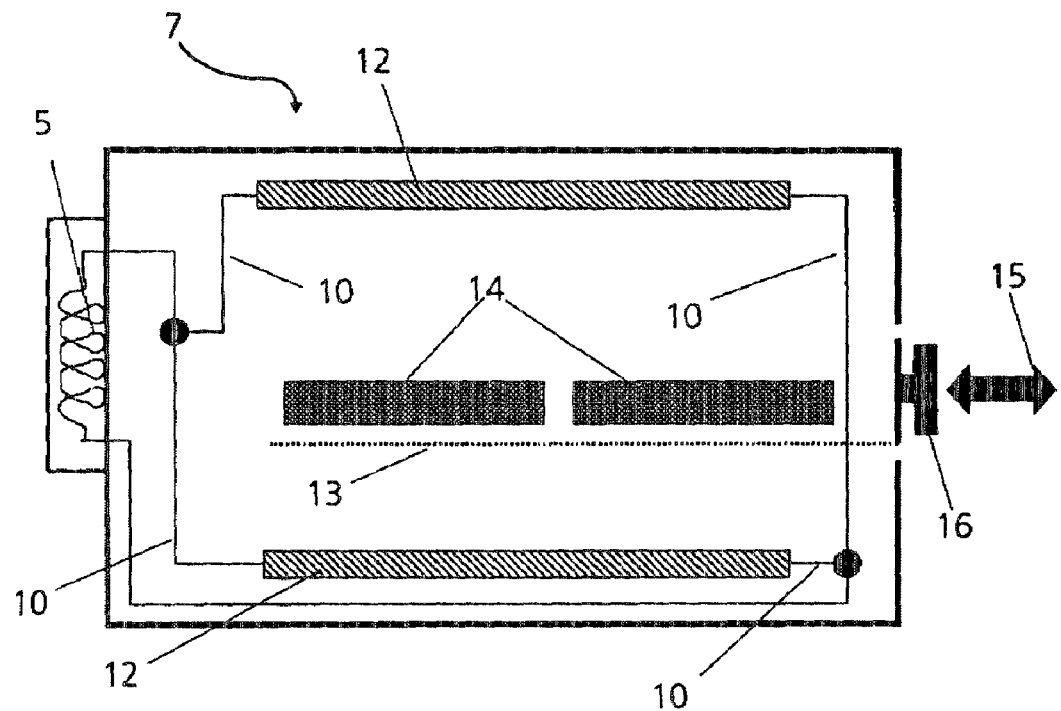
Figure 3:
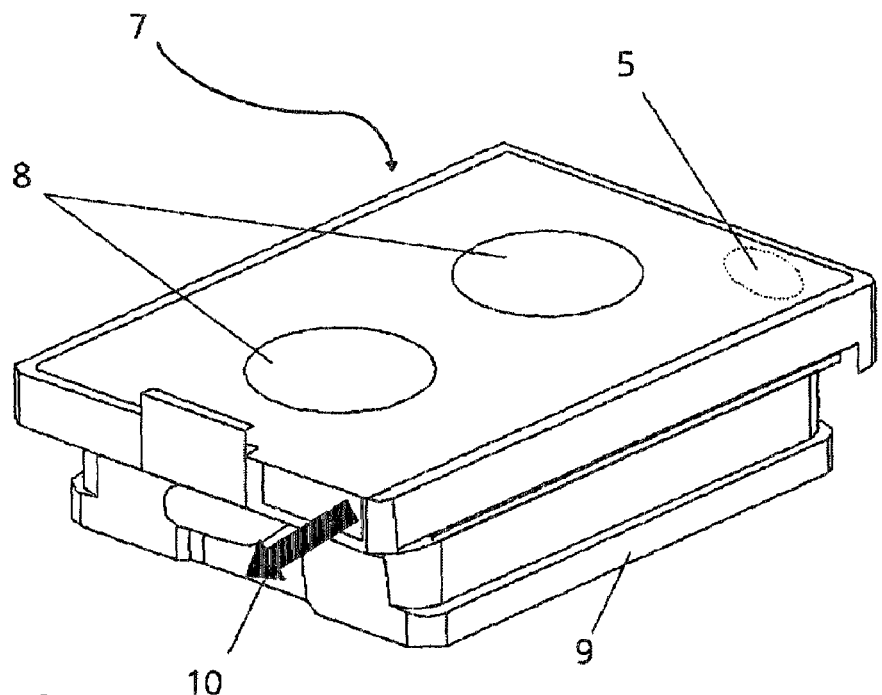
Figure 4:
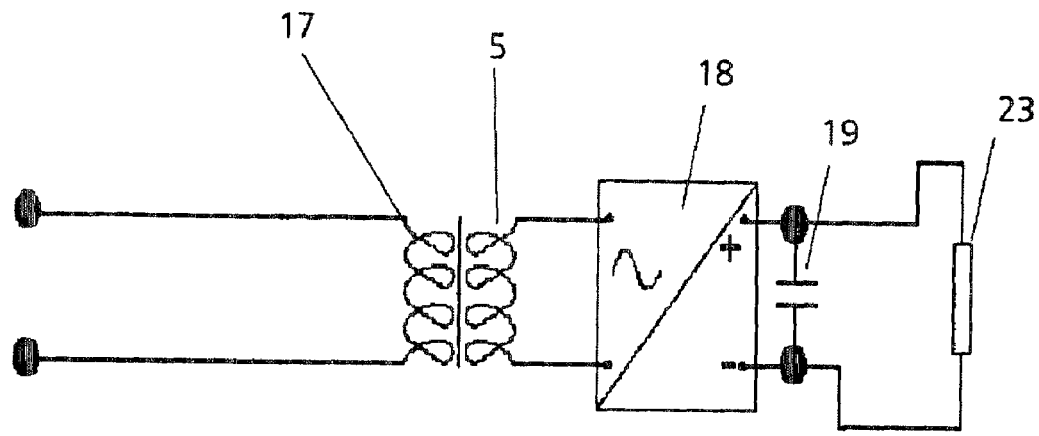
Figure 5:
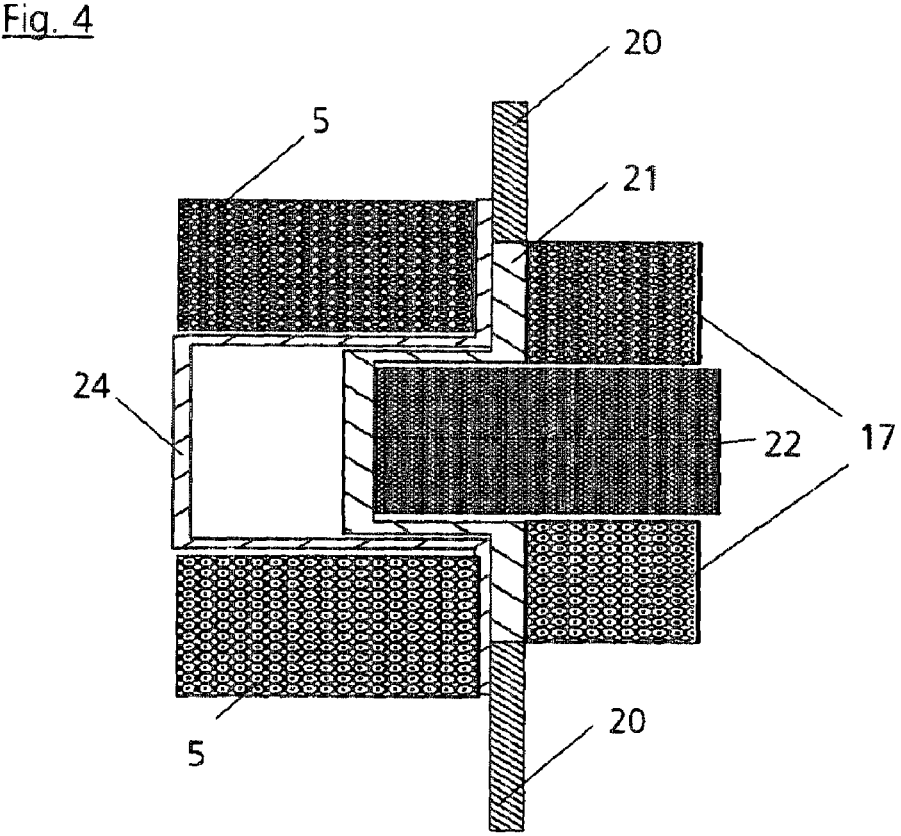
Figure 6:
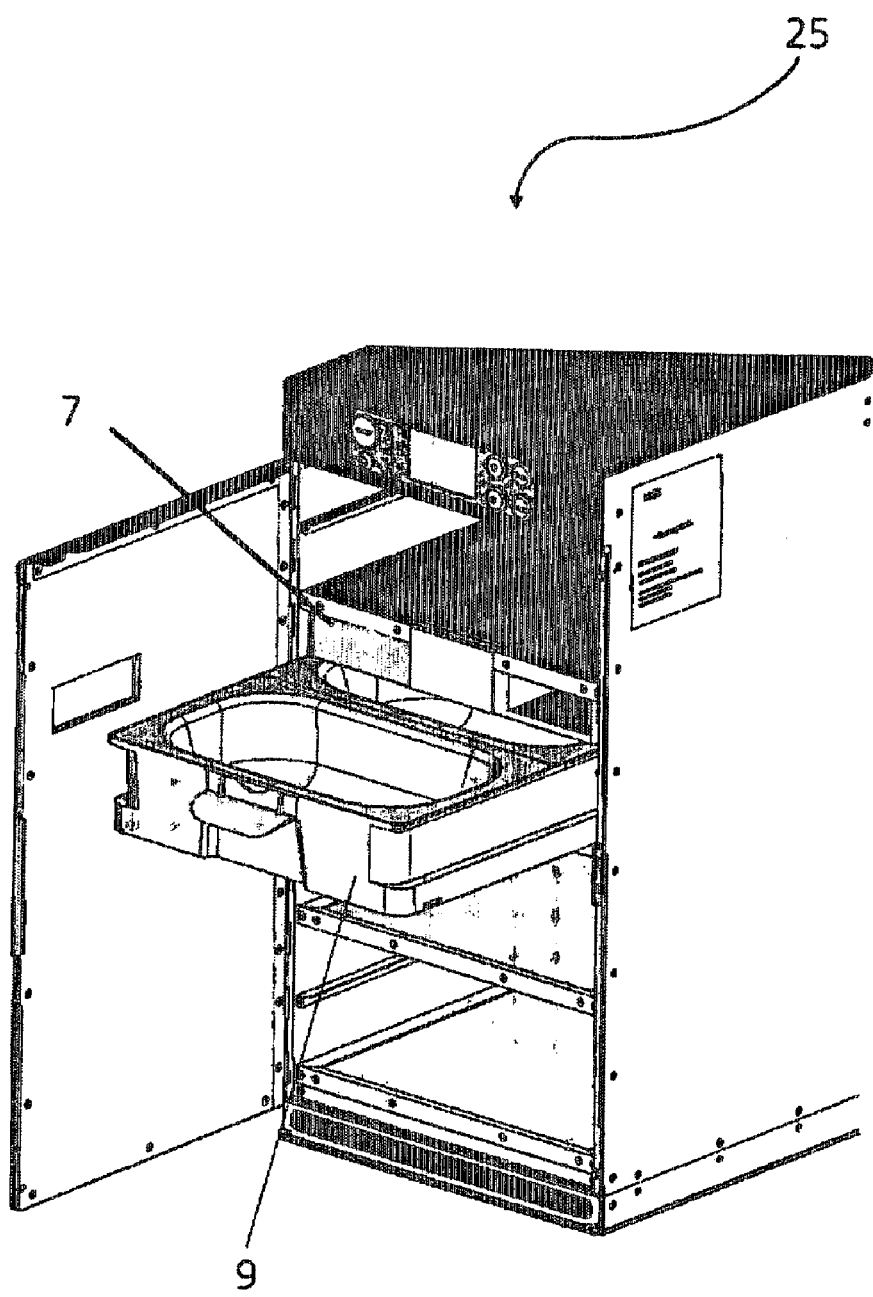
Figure 7:
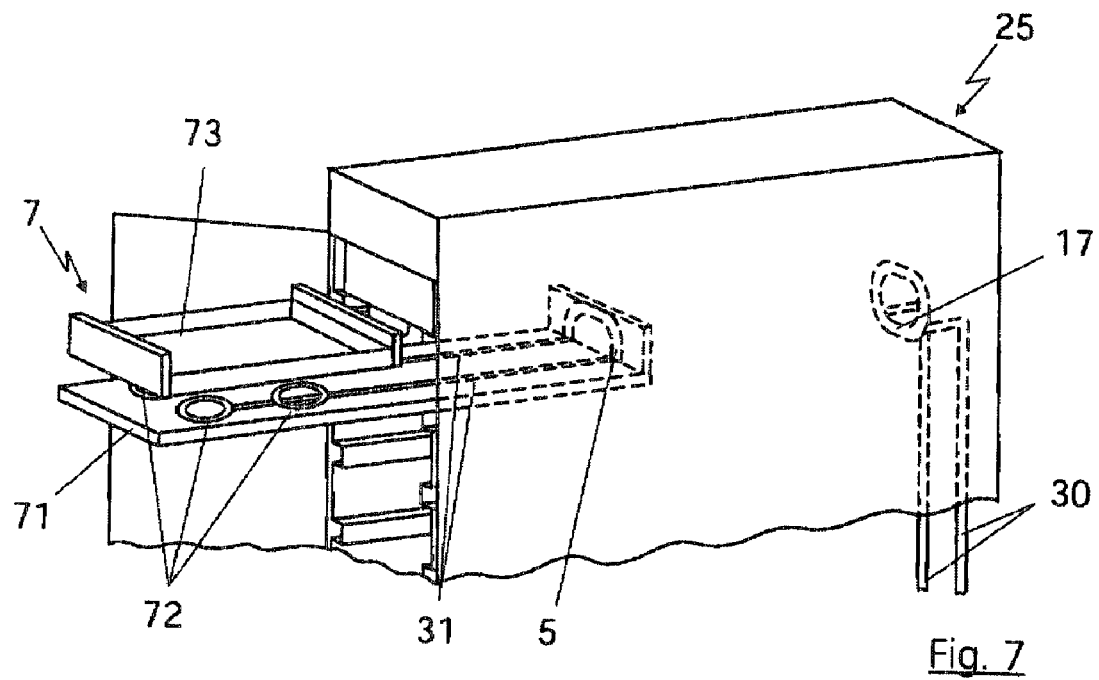
Figure 8:
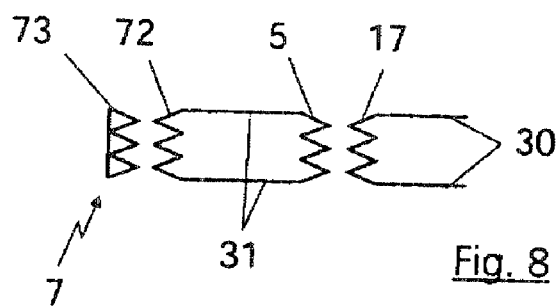
Figure 9:
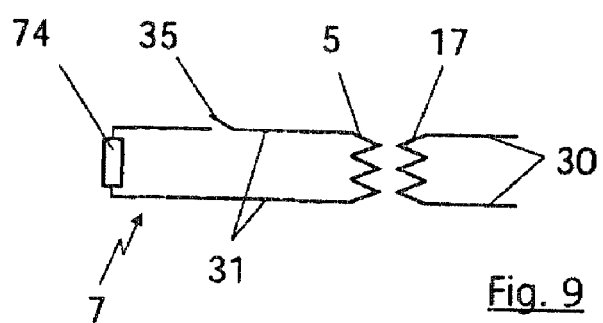

Exemplary embodiments of the invention will be described below with reference to the drawings, in which:

FIG. 1 shows three variants for the design of the conducting regions and the corresponding temperature distributions, FIG. 2 shows an exemplary embodiment of the invention in which a consumer is in the form of a toaster, FIG. 3 shows a further exemplary embodiment of the invention in which a consumer is in the form of an extractor, FIG. 4 shows an equivalent circuit diagram of the arrangement shown in FIG. 3, FIG. 5 shows the geometrical relationships in the region of the rear wall of an induction oven, FIG. 6 shows the arrangement of the consumer unit 7 in an induction oven, FIG. 7 shows a further embodiment of the invention, FIG. 8 shows an equivalent circuit diagram of the arrangement illustrated in FIG. 7; and FIG. 9 shows a further equivalent circuit diagram of an arrangement according to the invention.

In the upper parts of subfigures 1a-1c, FIG. 1 shows various variants for the design of the consumers designed as conducting regions 1, in a plan view of the base of a cooking vessel 2. The conducting regions 1 in the example shown are produced by virtue of the fact that insulating regions 3 are removed from an overall conducting region. In the lower parts of subfigures 1a-1c, the corresponding temperature distributions are illustrated as thermal images. In this case it can easily be seen from FIG. 1a that a ring-shaped configuration of the insulating regions 3 in the peripheral region of the base of the cooking vessel 2 results in comparatively strong heating of the peripheral regions of the base of the cooking vessel 2, while the central region remains relatively cool. The secondary coil is in this case formed by the connected conducting regions 1. The design of the conducting regions 1 in this case in particular opens up the possibility of compensating for local inhomogeneities in the electromagnetic field produced by the primary coil or altering the heating in a defined manner.

Heating of the central region of the base of the cooking vessel 2 can be achieved by the measure shown in subfigure 1b: in this case, a further insulating region 3' is arranged in the central region. The influence of the alignment of the further insulating region 3' can be seen from subfigure 1c.

FIG. 2 shows, in a sectional illustration, a further embodiment of the invention in which the consumer is in the form of a toaster. In this case, the secondary coil 5 and the heating elements 12, which are connected to the secondary coil 5 via electrical conductors 10, are arranged in the interior of the consumer unit 7. The grating 13, which is used for mounting the slices of toast 14, is fitted in the region between the flat heating elements 12. The overall consumer unit 7 can be introduced into and removed from an induction oven (not illustrated) by means of the handle 16 in the direction of the arrow 15. Since the functionality of the toaster merely consists in providing electrical power loss in the form of heat in the heating elements 12 acting as nonreactive resistors owing to the current induced in the secondary coil 5, when realizing the toaster according to the invention it is possible to dispense with providing complex passive and active electronic components in the interior of the consumer unit 7. As a result, this leads to a very simple possibility of realizing the toaster according to the invention. FIG. 2 shows the components outside of an induction oven (not illustrated); naturally these components are arranged in the interior of an induction oven during normal operation.

FIG. 3 represents a variant of the invention in which an extractor with the fans 8 is realized by means of the consumer unit 7. The figure illustrates the arrangement of the consumer unit 7 in relation to a withdrawable unit 9 arranged beneath the consumer unit 7; in this case, the withdrawable unit 9 is configured, for example, in such a way that it can accommodate cooking vessels with food to be heated. In order to improve the clarity of the figure, the induction oven which accommodates the consumer unit 7 and the withdrawable unit 9 during operation is omitted; the arrow 10 indicates the direction in which the consumer unit 7 and also the withdrawable unit 9 can be removed from the induction oven (not illustrated) or in which the steam guided away by the extractor escapes. The secondary coil 5, which is electrically connected to the fans 8 and draws electrical energy from an electromagnetic alternating field produced by a primary coil (not illustrated), is arranged in the rear region of the consumer unit 7.

FIG. 4 illustrates the arrangement shown in FIG. 3 using an equivalent circuit diagram. The full mid-frequency voltage is present at the primary coil 17 in the form of an AC voltage where $U_{MF\ rms}$=130-320 volts and at a frequency F of approximately 35-60 kHz. The AC voltage induced in the secondary coil 5 is converted in the rectifier 18 into a DC voltage and smoothed by means of the capacitor 19. In this case, the capacitor 19 can have a capacitance of approximately 100 μF. The consumers which, in the case of FIG. 3, are in the form of fans 8 are symbolized in FIG. 4 as an equivalent resistance 23, for example with a resistance value R of approximately 9 ohms. In conjunction with an output voltage of approximately 12 volts at the rectifier, a current of approximately 1.33 A results.

FIG. 5 illustrates the geometrical relationships in the region of the rear wall of the induction oven (not illustrated in FIG. 5). In the cooking area rear wall 20, the primary coil 17 is arranged in the housing 21. The ferrite 22, which extends, via a bay in the housing 21 and via a recess in the rear side 24 of the consumer unit (not illustrated) as far as into the inner region of the secondary coil 5 and in this way ensures a high degree of penetration of the region of the secondary coil 5 with magnetic flux, is located inside the primary coil 17. The ferrite 22 can in this case exhibit dimensions of approximately 8×22×10 mm; the primary coil 17 can in particular be formed from eight wires, each having a wire diameter of approximately 0.1 mm with in each case 250 turns. This results in an expected value for $R_{cu}$ of approximately 2.7 to 4 ohms and for the inductance L of approximately 2.3 mH. Six wires each having a diameter of 0.2 mm and a respective overall length of approximately 180 cm can be used for the secondary coil 5. This results in approximately 20 turns given an average diameter of approximately 38 mm and thus an inductance of approximately 12 μH.

FIG. 6 illustrates the arrangement of the consumer unit 7 in an induction oven 25. The figure shows the consumer unit 7 arranged above a withdrawable unit 9 when the door of the induction oven 25 is open.

FIG. 7 shows a further variant of the invention which demonstrates the flexibility of design which can be achieved by the invention. FIG. 7 illustrates a consumer unit 7, which is arranged in the induction oven 25 and comprises the oven drawer with the first consumer 72 and the second consumer 73. The oven drawer 71 in this case exhibits the induction coil 5, which is connected to the first consumers 72, which are likewise in the form of induction coils, via the lines 31. The second consumer 73 has been illustrated in simplified form and schematically as an aluminum shell for heating food. In this case, in the induction oven 25, the primary coil 17 is arranged in the region of the rear wall of the induction oven 25; an electrical AC voltage is applied to said primary coil via the feed lines 30 from an MF generator (not illustrated) of the induction oven 25. The electromagnetic alternating field thus produced couples to the secondary coil 5 when the consumer unit 7 is in the inserted state, which secondary coil is arranged in the rearward part of the consumer unit 7. The electrical AC voltage thus induced is transmitted via the lines 31 in the oven drawer 71 to the induction coils 72. The electromagnetic alternating field produced by the induction coils 72 induces electrical currents in the aluminum shell 73 which, owing to the nonreactive resistance, produce heat, as a result of which food in the aluminum shells 73 can be heated. In other words, what is involved is a series arrangement of two consumers within the consumer unit 7. Owing to the particular arrangement illustrated in FIG. 7, the two consumers 72 and 73 are supplied with energy in contactless fashion, inductively and therefore in DC-isolated fashion. As a result, it is possible to convert the design of a contactless or cableless oven drawer 71 or consumer unit 7 which improves the operability of the induction oven 25 according to the invention more decisively. The primary coil 17, the secondary coil 5 and the first consumers 72 can in this case in particular be in the form of copper coils.

The arrangement according to the invention is explained once again with reference to FIG. 8 in a form of an equivalent circuit diagram for illustrative purposes. In this case, the illustration in FIG. 8 is restricted to the consumer unit 7 and the primary coil 17 (illustrated in the right-hand part of the figure) with the feed lines 30. It can clearly be seen from FIG. 8 that the arrangement comprising the secondary coil 5, the lines 31 and the first consumers 72 is an advantageous possibility of transferring, for example, an electromagnetic alternating field to a point in the consumer unit 7 at which it is required, depending on the respective demand. The basic principle of the invention is in this case converted in the present example in such a way that the consumer is split into two subconsumers, namely the induction coils 72 and the aluminum shell 73.

FIG. 9 likewise shows, in the form of an equivalent circuit diagram, a further variant of the invention which makes very simple temperature regulation possible. In the consumer unit 7 illustrated in FIG. 9, the consumer 74, which may have any desired design, is connected to the secondary coil 5 of the consumer unit 7 via the feed lines 31. In the way which has already been described, an electrical AC voltage is induced in the secondary coil 5 via the electromagnetic alternating field of the primary coil 17. The defined feed lines 31, via which the consumer 74, which may be in the form of a heating element, for example, is supplied with voltage, make it possible to introduce the thermostat 35 into the feed lines 31. At a certain predefinable desired temperature, which may be configured so as to be completely controllable, the electrical connection is then isolated from the thermostat 35 between the secondary coil 5 and the consumer 74. As a result, in comparison with the conventional solution in which there is no physically defined power supply to the heating elements but in which the heating elements are in the form of metallic layers in which physically undefined currents are induced, the particular advantage is achieved that simple temperature regulation can be realized in the consumer unit 7 itself.

The invention claimed is:

1. An induction oven (25) comprising:
   a consumer unit (7) for converting inductively transmitted electrical energy having at least one secondary coil (5) for drawing energy from an electromagnetic alternating field,
   the secondary coil (5) being electrically connected to at least one consumer in which the electrical energy is converted, and
   the consumer unit (7) being in the form of a replaceable module for the interior of the induction oven (25).

2. The device according to claim 1, wherein that the at least one consumer is a structured electrically conducting region (1), in a cooking vessel (2), which is suitable for converting electrical current, owing to its nonreactive resistance, into heat.

3. The device according to claim 2, wherein that the conducting region (1) is designed such that a total magnetic flux, beneath the conducting region, results in a desired heat distribution.

4. the device according to claim 2, wherein that the cooking vessel (2) is at least partially made from porcelain.

5. The device according to claim 4, wherein the conducting region (1) is overglazed onto the cooking vessel (2).

6. The device according to claim 2, wherein that the cooking vessel (2) is at least partially made from cardboard.

7. The device according to claim 1, wherein the at least one consumer is one of: a coffee machine, a toaster, a waffle iron, a sandwich maker, a baking oven, a hot air oven, a water heater, a water boiler, a grill plate, an egg cooker, an extractor hood, a fryer and a microwave.

8. The device according to claim 1, wherein that the secondary coil (5) is formed as part of a printed circuit board.

9. The device according to claim 1, wherein the consumer unit (7) has a first consumer and an induction coil (72) which is electrically connected to the secondary coil (5).

10. The device according to claim 9, wherein the induction coil (72) is electrically connected to the secondary coil (5) by means of lines (31).

11. The device according to claim 1, wherein a temperature-regulating switch is arranged in the electrical connection between the secondary coil (5) and the consumer (74).

12. The device according to claim 11, wherein the temperature-regulating switch is a thermostat (35).

13. A method for providing conducting regions (1) as structures on a cooking vessel (2) for an induction oven (25), the method comprising the steps of:
   initially providing the cooking vessel (2) with a conducting layer, and
   then partially removing at least a portion of the conductive layer by a sandblasting method.

14. The method according to claim 13, further comprising the step of removing at least a portion of the conducting layer using a mask by which individual regions of the conductive layer are protected from the sandblasting method.

15. A consumer unit (7) for converting inductively transmitted electrical energy with at least one secondary coil (5) for drawing energy from an electromagnetic alternating field, the secondary coil (5) being electrically connected to at least one consumer, in which the electrical energy is converted, and the consumer unit (7) being in the form of a replaceable module for the interior of an induction oven (25).

* * * * *